Oct. 29, 1929.                A. MERTZ                 1,733,422
                               PISTON
                         Filed Aug. 23, 1926
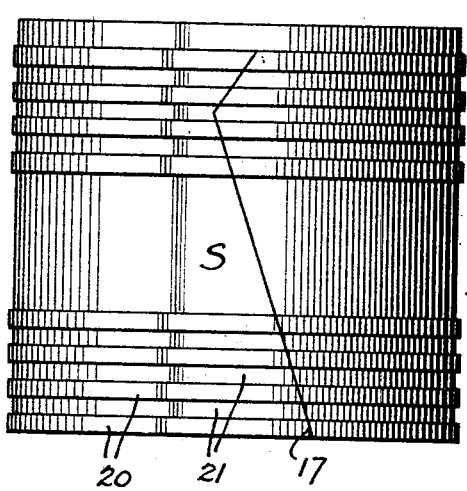
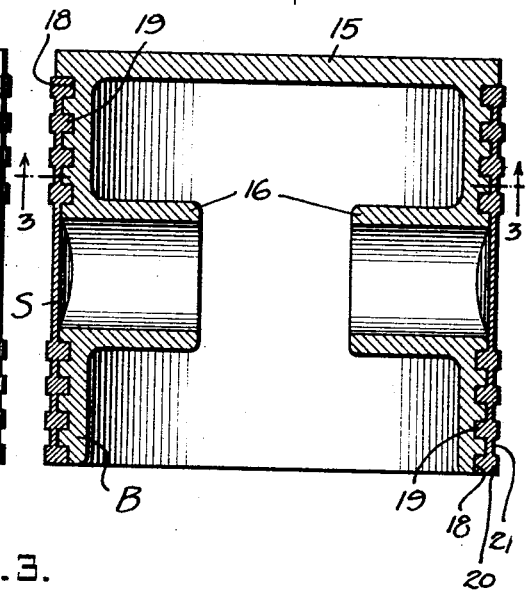
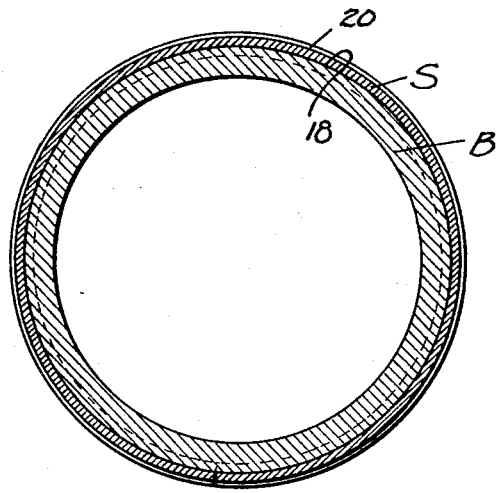
INVENTOR.
ALBERT MERTZ
BY Munn & Co.
ATTORNEYS.

Patented Oct. 29, 1929

1,733,422

UNITED STATES PATENT OFFICE

ALBERT MERTZ, OF CORONADO, CALIFORNIA

PISTON

Application filed August 23, 1926. Serial No. 131,075.

My invention relates to pistons particularly adapted, although not necessarily, for use in internal combustion engines.

A purpose of my invention is the provision of a piston having means by which the skirt of the piston can be shortened in length and yet overcome the tendency of the piston to rock in the cylinder and eliminate the attendant disadvantages.

It is also a purpose of my invention to provide a piston which is much shorter than pistons heretofore proposed with a wrist pin in the center of the piston, a much lighter piston and one in which a greater radiation of heat is effected, as well as one which is practically leakproof when installed in a cylinder so that greater compression and hence more power than is possible with standard pistons can be secured. I will describe only one form of piston embodying my invention and will then point out the novel features thereof in the claim.

In the accompanying drawings,

Figure 1 is a view showing in side elevation one form of piston embodying my invention;

Figure 2 is a central vertical sectional view of the piston shown in Figure 1;

Figure 3 is a horizontal sectional view taken on the line 3—3 of Figure 2.

Referring specifically to the drawings, my invention, in its present embodiment, comprises an annular body B closed at its upper end by a wall 15 and open at its lower end to permit the extension into the body of a wrist pin (not shown) which is adapted to be journaled in a pair of bearings 16 extending inwardly from and formed integral with the body B and disposed substantially medially of the ends of the body.

A sleeve designated generally as S is mounted on the body B in surrounding relation thereto, and this sleeve is formed of resilient metal and split longitudinally as indicated at 17 in order that it may freely expand when in applied position to take up the clearance between the piston body and the wall of the cylinder. For locking the sleeve against displacement longitudinally on the piston body various means may be provided. One simple, practical and inexpensive means is illustrated, although it is to be understood that I do not wish to be limited or restricted to this precise means. This means comprises the provision of a plurality of annular grooves 18 in the periphery of the body B, and in the present instance I have shown these grooves at regular spaced intervals, both above and below the bearings 16, although in certain instances it may not be necessary to provide the grooves below the bearing 16. These grooves 18 are designed to receive annular ribs 19 formed on the inner wall of the sleeve S, these ribs constituting rings adapted to fit in the grooves in the same manner as the standard piston ring. Thus the ribs engage within the grooves to lock the sleeve against displacement longitudinally on the piston body.

In order that the sleeve S may wear rapidly to a proper fit within a cylinder and to seal the piston against the passage of oil upwardly to the combustion end of the cylinder, as well as to trap oil in lubricating relation to the piston and cylinder wall, I provide the periphery or exterior surface of the sleeve with a plurality of annular ribs 20 arranged at intervals corresponding to the ribs 19 and thus spaced apart to form intervening grooves 21. In the present instance I have shown a plurality of such ribs 20 both above and below the bearing 16. These ribs 20 constitute rings which, when the piston is working within a cylinder, perform the functions above mentioned.

In applying the sleeve to the piston body, it is expanded and extended over the bottom of the body, the internal ribs 19 finally engaging within the grooves 18 and thereby holding the sleeve against displacement lengthwise on the piston.

In practice, the piston body is of such diameter that it will not crowd the sleeve against the wall of a cylinder, there being a few thousandths clearance between the piston and the sleeve, and with an oil film the possibility of pressure leakage around the piston is thus reduced to a minimum and much less than when using separate rings, as in the standard form of piston. It will be understood that the ribs 20 function as piston rings, they being free to expand because they constitute an integral part of the sleeve S which is split and thus free to expand.

An important feature of my invention resides in the provision of a piston having an expansible sleeve substantially co-extensive in length therewith and functioning in the capacity of a plurality of piston rings. The piston in this construction may be made much shorter than the ordinary piston, as the necessity of a skirt to overcome the tendency of the piston to rock within the cylinder under the rotary motion of the crank shaft is overcome. This advantage is enhanced by positioning the wrist pin substantially medially of the ends of the piston.

It is to be particularly noted that the sleeve S is in contact with the piston body B along its whole length. Thus a greater radiation of heat in respect to the piston is effected as the sleeve has a greater area of contact with the cylinder wall and, hence, it provides a good conductor for carrying the heat of the piston to the wall of the cylinder. In this manner, the piston is maintained at a relatively low temperature, as compared to the standard piston.

Although I have herein shown and described only one form of piston embodying my invention, it is to be understood that various changes and modifications may be made therein without departing from the spirit of the invention and the spirit and scope of the appended claim.

I claim as my invention:

A piston having a skirt, the outer periphery of which is provided with a plurality of annular ribs and intervening annular grooves, and a flexible sleeve split in the direction of its length and having annular ribs at corresponding points on the inner and outer peripheries thereof and intervening annular grooves, the grooves on the inner periphery of the sleeve and those on the skirt receiving, respectively, the ribs on the skirt and those on the inner periphery of the sleeve.

ALBERT MERTZ.